(12) United States Patent
Bartlett

(10) Patent No.: US 6,598,298 B1
(45) Date of Patent: Jul. 29, 2003

(54) FIELD DRESSING TOOL FOR SMALL GAME

(76) Inventor: Timothy J. Bartlett, 118 Jefferson Pl., Hobbs, NM (US) 88240

( * ) Notice: Subject to any disclaimer, the term of this patent is extended or adjusted under 35 U.S.C. 154(b) by 0 days.

(21) Appl. No.: 09/960,802

(22) Filed: Sep. 21, 2001

(51) Int. Cl.[7] .............................. B26B 11/00; A22B 5/20
(52) U.S. Cl. ................................ 30/143; 30/136; 7/133; 7/158; 452/117; 452/160
(58) Field of Search .................... 30/123, 142, 143, 30/146, 145, 136; 452/102, 104, 117, 128, 132, 136, 137, 160, 164; 7/159, 161, 130, 133, 128, 158

(56) References Cited

U.S. PATENT DOCUMENTS

| | | | |
|---|---|---|---|
| 2,787,020 A | * 4/1957 | Hunt | 452/117 |
| 4,461,080 A | 7/1984 | Olson | 452/117 |
| 4,607,432 A | 8/1986 | Montgomery | 452/117 |
| 5,581,895 A | * 12/1996 | Jeffcoat | 30/294 |
| 6,098,225 A | * 8/2000 | McIntosh et al. | 7/158 |
| 6,128,805 A | 10/2000 | Rivera | 16/111.1 |
| 6,280,312 B1 | * 8/2001 | Elrod et al. | 452/160 |

OTHER PUBLICATIONS

Dunn's Supply Catalog; DN 2001 #4; p. 78, Left hand column, middle of page; "Bird Hunter's Multi–Tool".

* cited by examiner

Primary Examiner—Hwei-Siu Payer
(74) Attorney, Agent, or Firm—Winstead Sechrest & Minich P.C.; Henry L. Ehrlich

(57) ABSTRACT

A field dressing tool of the type for field dressing small game, is provided. The field dressing tool including: a pair of handles each having a first and second end, each handle forming a trough; a cutting blade connected to a first end of each of said handles, the cutting blades functionally interconnected by a pivot joint; a knife member having a first edge tapering to a point and a notch formed proximate the point on an edge opposite the first edge, the knife member pivotally connected to the second end of one of the handles and pivotable from a position disposed within a trough to a position extending from a handle; and a rake member pivotally connected to the second end of one of the handles, the rake being pivotable from a position disposed within a trough to a position extending from a handle.

19 Claims, 1 Drawing Sheet

FIELD DRESSING TOOL FOR SMALL GAME

FIELD OF THE INVENTION

The present invention relates generally to multipurpose tools and more specifically to a compact tool adapted for field dressing small game.

BACKGROUND OF THE INVENTION

Field dressing is the procedure performed by hunters proximate the time of taking a game animal to prevent the contamination and spoiling of the game meat. Typically, field dressing is performed to immediately remove the entrails and the feed from the animal before transporting the meat to a site for final cleaning, refrigeration or cooking.

Typically bird hunters carry the birds obtained in a pouch or vest pocket until the hunt is completed. Due to the inconvenience and the mess associated with common field dressing techniques many hunters leave the birds in a pouch until reaching a destination more suitable to cleaning and storing the birds. This practice often results in the meat spoiling due to the ambient heat and the heat remaining in the entrails of the bird. Even if the meat does not spoil the feed may ferment and or the entrails contaminate the meat deleteriously affecting the taste of the meat. Many hunters perform a quick and dirty form of field dressing that again often leaves feed and entrails that may spoil or contaminate the meat.

Although field dressing birds and small game is much simpler then dressing larger game such as deer and elk all to often meat is lost due to failure to timely dress or completely dress the capture. In fact, small game captures are often lost or spoiled because it is easier and less messy to take the entire carcass to a location more convenient for cleaning, although the meat is spoiling and degrading during the trip.

The method of field cleaning small game is also determined by the desired method of cooking the capture. For example, if it is desired to only cook the breast of a bird, which is often the case with dove and quail, it is only necessary to remove the breast of the bird. In this case the skin is peeled from the breast, the feed and entrails removed, and the wings cut from the breast. This method of field dressing can be done fairly rapidly in the field.

Often times it is desired to maintain the whole bird for cooking. This is often desired with the smaller birds such as dove and quail as well as for turkeys, ducks, pheasants and other popular game birds. Cleaning whole birds is typically a messy, time consuming, and not necessarily pleasant project, it is even more difficult when it is desired to maintain the skin on the bird. An example of cleaning a whole turkey is: lay the turkey on it's back; find a spot between the sternum and the anus of the bird and make an incision, just through the skin, large enough to insert your hand; reach into the incision and pull out the entrails, making sure the heart and lungs are removed; follow the intestine down and cut the anus out not rupturing the intestines; cut at the neck of the turkey and remove the feed from the top of the breast; wash and wipe out the interior of the turkey; and pluck the turkey. The legs and wings should also be removed, although it may be necessary to leave one for identification pursuant to hunting regulations.

It is common in prior art techniques for cleaning a bird to utilize a knife and the user's hands. As can be imagined this can be a very messy process often resulting in undesirable and contaminating material being left in contact with meat.

It is therefore a desire to provide a unitary tool that may be utilized to effectively and efficiently field dress small game such as fowl. It is a desire to provide a unitary tool that includes shears, a knife including an entrail hook and an entrail rake. It may be a further desire to include shears, knife with entrail hook and entrail rake in a foldable, unitary tool.

SUMMARY OF THE INVENTION

It is thus one feature of the present invention to provide a unitary game dressing tool having shears, a knife including an entrail hook and an entrail rake.

It is a further feature of the present invention to provide a unitary game dressing tool having shears, a knife including an entrail hook and an entrail rake that is foldable into a safe a convenient tool for transport.

It is still a further feature of the present invention to provide a unitary game dressing tool that is structured for easy cleaning to remove undesirable material and contaminating material.

Accordingly, a field dressing tool of the type for field dressing small game is provided. The field dressing tool including: a pair of handles each having a first and second end, each handle forming a trough; a cutting blade connected to a first end of each of said handles, the cutting blades functionally interconnected by a pivot joint; a knife member having a first edge tapering to a point and a notch formed proximate the point on a edge opposite the first edge, the knife member pivotally connected to the second end of one of the handles and pivotable from a position disposed within a trough to a position extending from a handle; and a rake member pivotally connected to the second end of one of the handles, the rake being pivotable from a position disposed within a trough to a position extending from a handle.

The knife member and entrail hook and the entrail rake may be connected to the same handle and disposable into the same trough. It may be desired to attach the separate members in opposing handles.

The cutting or shear blades may be rigidly connected to the handles. The cutting or shear blades may be pivotally connected to the individual handles so as to be foldable into the troughs formed by the handles.

The knife member and entrail hook may further include a detent, lip or other formed dull section to permit the placement of a user's hand or finger to further control use of the knife member. The dulled section may be located on the first or second edge of the knife member depending on the orientation of the knife member as pivotally connected to the handle. It may also be desired to include a locking mechanism to maintain the knife, when desired, in a secured open position.

The rake member includes an elongated shaft section and a rake section extending substantially perpendicular therefrom. It is preferable to size the width of the rake section for particular sized animals. It may be desired for the rake section to have a blunted end to prevent unintended rupture of the game's entrails. The rake end may further include tines to aid in scraping the entrails.

The foregoing has outlined rather broadly the features and technical advantages of the present invention in order that the detailed description of the invention that follows may be better understood. Various combinations of feature may be utilized singularly or in combination to achieve the invention as taught. Additional features and advantages to the invention will be described hereinafter which form the subject of the claims appended hereto.

BRIEF DESCRIPTION OF THE DRAWINGS

The foregoing and other features and aspects of the subject invention will be best understood with reference to the accompanying drawings of a specific embodiment of the invention, wherein.

DETAILED DESCRIPTION OF A SPECIFIC EMBODIMENT OF THE INVENTION

Figures 1, 2, 3:
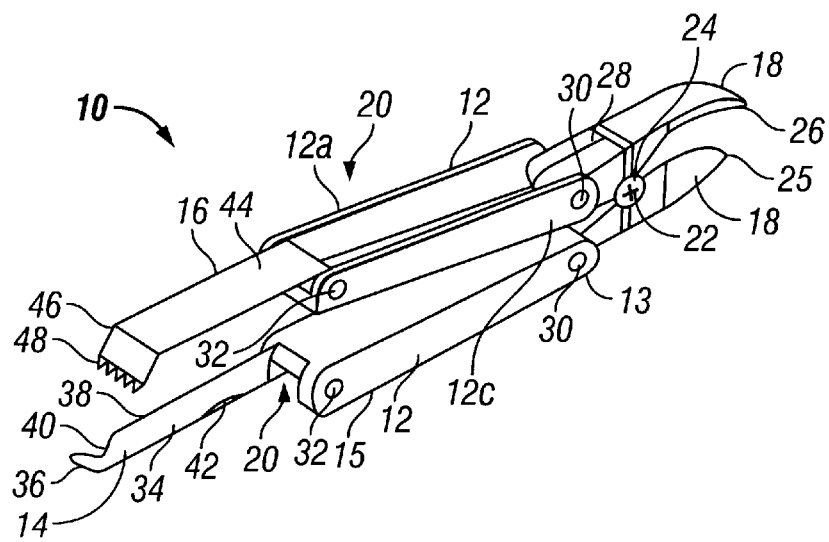
FIG. 1 is a perspective view of the dressing tool of the present invention.
FIG. 2 is a perspective view of the field dressing tool of the present invention with the knife and entrail hook and rake retracted into a trough formed by each handle.
FIG. 3 is a perspective view of the field dressing tool folded for storage and transport.

Refer now to the drawings wherein depicted elements are not necessarily shown to scale and wherein like or similar elements are designated by the same reference numeral through the several Figures.

FIG. 1 is a perspective of the field dressing tool of the present invention generally designated by the numeral 10. Dressing tool 10 includes a pair of handles 12, a combination knife and entrail hook 14, an entrail rake 16 and a pair of interconnected cutting blades 18. FIG. 1 illustrates field dressing tool 10 with all elements extended simultaneously for demonstration purposes.

In one embodiment of the present invention handles 12 are formed by three sides 12a, 12b and 12c to define a trough 20. Handles 12 may be formed of many different types of material that are adapted for withstanding the extreme temperature environments and stress factors necessary for utilization as a hunting and fishing tool. For example, handles 12 may be constructed of stainless steel so as to both withstand the environmental and stress conditions encountered as well as to resist corrosion. Handles 12 may include grip enhancing and/or aesthetic material.

Each handle 12 is connected at a first end 13 to a cutting blade jaw 18 interconnected pivotally at a pivot joint 22 defined by a suitable fastener such as a rivet defining an axis of rotation 24 of the pivot joint 22, about which cutter blades 18 pivot with respect with each other. Each cutting blade 18 has a tapered cutting edge 26 and a base portion 28 separated from each other by pivot joint 22. Blades 18 are constructed of a high strength material such as stainless steel. Blade jaws 18 are moveable so as to open to form a gap 25 sufficient to reach in and around the legs and wings of a bird so as to be closed cutting the appendage off of the bird. It is also desirable that jaws 18 be constructed of sufficient strength to cut through the shoulder joint of the bird. Jaws 18 may be designed in varying lengths and gaps for various size birds.

Pivot axles 30 movably connect each handle 12, at first end 13 to a cutter blade 18. Handles 12 are moveable about pivot axles 30 between an open position as shown in FIGS. 1 and 2 to a closed, folded position as shown in FIG. 3.

Each handle 12 forms a trough 20 for retracting at least one attachment such as rake 16 or knife and entrail hook 14. As shown in FIG. 1 knife 14 and rake 16 may be extended outwardly from handles 12 for use. Knife 14 and rake 16 may also be pivoted into trough 20 for storage as shown in FIGS. 2 and 3.

A knife and entrail hook 14 is pivotally connected between sidewalls 12a and 12b by a pivot axle 32 in one of handles 12 proximate to a second end 15 of handle 12 opposite cutting blades 18. Knife 14 has a first edge 34 that tapers to a point 36. First edge 34 may be sharpened to a desired edge for use as an ordinary knife. Located on a top edge 38 of knife 14 is a notch 40. In at least one embodiment that notch 40 extend at least 0.25 inches relative to top edge 38. Notch 40 forms an entrail hook along blade 14 to allow a user to run blade 14 around the breast cavity of the bird to separate the breast from the bird's back and prepare for entrail removal. A detent or dulled support section 42 may be formed along blade edge 34 for placement of a user's finger when utilizing the entrail hook 40 portion of knife 14. Although not shown it may be desired to include a locking mechanism to maintain knife 14 in an extended position.

Field dressing tool 10 further includes an organ rake 16 pivotally connected between side walls 12a and 12c via a pivot axle 32 in a handle 12 proximate the end opposite cutting blades 18. Rake 12 includes an elongated shaft 44 having sufficient length to reach into the interior of a bird. Shaft 44 may be extendable or of varying lengths for different type birds, for example a first length for quail or dove and a second length for turkey and the like. Extending substantially perpendicular from an end of shaft 44 is a rake end 46. Rake end 46 may include a tine or multiple tines 48 to aid in removing entrails from the interior of the bird.

It should be recognized that pivot axles 30 and 32 may be formed by various means, including but not limited to rivets and pins.

FIG. 2 is a perspective view of field dressing tool 10 with knife 14 and rake 16 retracted into trough 20. As shown, knife 14 and rake 16 are pivoted into trough 20 so as to not interfere with the user's access to handles 12 for operation of cutting blades 18. With reference to FIGS. 1 and 2, knife 14 and rake 16 may be oriented in different manners.

FIG. 3 is a perspective view of field dressing tool 10 folded into the storage embodiment. Handles 12 are pivoted around pivot axles 30 relative to pivot point 22 (FIG. 1) so as to position cutter blades 18 within troughs 20. Additionally, knife 14 and rake 16 are pivoted into troughs 20. In this manner field dressing tool can safely, and compactly be carried in a pocket or carrying pouch.

Use of field dressing tool 10 of the present invention is described with reference to FIGS. 1 through 3. Field dressing tool 10 is folded so that knife and entrail hook 14 are disposed within a trough 20; entrail rake 20 is pivoted so as to be disposed within a trough 20. Handles 12 are pivoted about pivot axles 30 so as to dispose cutter blades 18 within troughs 20 as shown in FIG. 3. Field dressing tool 10 may then be stored and carried in any manner desired by the user such as in a belt pouch, clothing pocket, vest or the like. It should also be recognized that cutting blades 18 may remain and be constructed so as not to be foldable within troughs 20.

For illustration purposes, only one method of cleaning a bird for maintaining the whole bird is disclosed. As is well known, the order of cleaning is somewhat dependent on the user.

After capture of a bird and preparation for transport field dressing tool 10 is removed from storage and folded, if necessary, so that cutter blades 18 extend outwardly from handles 12 and are in operational connection with handles 12. Utilizing handles 12 and cutter blades 18 the user may cut the wings and legs from the bird conforming to governmental hunting regulations.

Knife and entrail hook 14 are pivoted about axle 32 to extend from trough 20 and handle 12. Knife tip 36 and cutting edge 34 are utilized to cut through the skin between the breast and anus of the bird. Knife and entrail hook 14 can then be turned and inserted through the incision to remove the entrails from attachment to the back and breast of the bird utilizing notch 40. Utilizing notch 40 to cut attachments and the dull side of knife 14 it is less likely to release fluids from entrails that may contaminate the meat. Knife and entrail hook 14 may then be pivoted back into trough 20.

Rake 16 may then be pivoted about axle 32 to extend from trough 20 and handles 12. Rake 16 is then inserted into the incision and used to scrape the entrails from the back and breast of the bird. Utilization of rake 16 alleviates the necessity of the user having to open the bird up so as to insert a hand to clean the entrails out. It may be desired to have tines 48 or not extending from rake end 46. In either situation it is desired to have a substantially blunt end to prevent puncturing of the entrails. Once the entrails are removed rake 16 may be folded back into trough 20.

Additionally, a slot should be opened above the breast to remove the feed. Opening this upper slot may be accomplished utilizing cutter blades 18 or knife 14. Rake 16 may be utilized to remove the feed. Upon completion of the field dressing, tool 10 may be folded for storage as shown in FIG. 3.

Field dressing tool 10 provides a simple and effective manner to field dress small game in a manner to reduce the mess, reduce spoilage of meat and reduce the destruction of meat over prior art methods of field dressing. Additionally, the three-sided design of handles 12 and the material of construction permit complete and effective cleaning of tool 10.

From the foregoing description of the invention, including the drawings, it should be apparent that a field dressing tool for small game has been disclosed. Although a specific embodiment is shown herein, this has been done solely for the purposes of disclosing the invention in its various aspects, and is not intended to be limiting with the scope of the invention as defined in the claims. It is contemplated that various substitutions, alterations, and or modifications, including but not limited to various design alternatives which may be specifically discussed herein, may be made to the disclosed embodiment without departing from the spirit and scope of the invention.

What is claimed is:

1. A field dressing tool for game, said tool comprising:
   a pair of handles each having first and second ends, each said handle forming a trough;
   pair of cutting blades each connected to said first end of a respective one of said handles, said cutting blades functionally interconnected by a pivot joint, said handles pivotally moveable from a position extending from said cutting blades in a manner for operation and foldable to a position wherein said cutting blades are disposed within said troughs;
   a knife member having a first edge tapering to a point and a notch formed proximate said point on an edge opposite said first edge, said knife member pivotally connected to said second end of one of said handles, said knife member being pivotable from a position disposed within said trough of said one handle to a position extending from said one handle; and
   a rake member having an elongated shaft pivotally connected to said second end of the other of said handles and a rake end extending substantially perpendicular from said elongated shaft, said rake member being pivotable from a position disposed within said trough of said other handle to a position extending from said other handle.

2. The field dressing tool of claim 1 wherein said rake end has a blunted edge.

3. The field dressing tool of claim 2 wherein said knife member includes a dulled section formed along said first edge.

4. The field dressing tool of claim 1 wherein said rake end includes at least two tines extending therefrom.

5. The field dressing tool of claim 4 wherein said knife member includes a dulled section formed along said first edge.

6. The field dressing tool of claim 1 wherein said knife member includes a dulled section formed along said first edge.

7. A field dressing tool for game, said tool comprising:
   a pair of handles each having first and second ends, each said handle forming a trough;
   pair of cutting blades each connected to said first end of a respective one of said handles, said cutting blades functionally interconnected by a pivot joint;
   a knife member having a first edge tapering to a point and a notch formed proximate said point on an edge opposite said first edge, said knife member pivotally connected to said second end of one of said handles, said knife member being pivotable from a position disposed within said trough of said one handle to a position extending from said one handle; and
   a rake member pivotally connected to said second end of the other of said handles, said rake member being pivotable from a position disposed within said trough of said other handle to a position extending from said other handle.

8. The field dressing tool of claim 1 wherein said knife member includes a dulled section formed along said first edge.

9. The field dressing tool of claim 8 wherein each said handle is pivotally connected to a respective one of said cutting blades in a manner such that said handles are moveable from a position extending from said cutting blades in a manner for operation and foldable to a position wherein said cutting blades are disposed within said troughs.

10. The field dressing tool of claim 7 wherein said rake member includes an elongated shaft having a rake end extending substantially perpendicular therefrom, said rake end having a substantially blunted end.

11. The field dressing tool of claim 3 wherein said knife member includes a dulled section formed along said first edge.

12. The field dressing tool of claim 11 wherein each said handle is pivotally connected to a respective one of said cutting blades in a manner such that said handles are moveable from a position extending from said cutting blades in a manner for operation and foldable to a position wherein said cutting blades are disposed within said troughs.

13. The field dressing tool of claim 10 wherein each said handle is pivotally connected to a respective one of said cutting blades in a manner such that said handles are moveable from a position extending from said cutting blades in a manner for operation and foldable to a position wherein said cutting blades are disposed within said troughs.

14. The field dressing tool of claim 7 wherein said rake member includes an elongated shaft having a rake end extending substantially perpendicular therefrom, said rake end having at least two tines extending therefrom.

15. The field dressing tool of claim 4 wherein said knife member includes a dulled section formed along said first edge.

16. The field dressing tool of claim 15 wherein each said handle is pivotally connected to a respective one of said cutting blades in a manner such that said handles are moveable from a position extending from said cutting blades in a manner for operation and foldable to a position wherein said cutting blades are disposed within said troughs.

17. The field dressing tool of claim 14 wherein each said handle is pivotally connected to a respective one of said cutting blades in a manner such that said handles are moveable from a position extending from said cutting blades in a manner for operation and foldable to a position wherein said cutting blades are disposed within said troughs.

18. The field dressing tool of claim 7 wherein each said handle is pivotally connected to a respective one of said cutting blades in a manner such that said handles are moveable from a position extending from said cutting blades in a manner for operation and foldable to a position wherein said cutting blades are disposed within said troughs.

19. A field dressing tool for game, said tool comprising:

a pair of handles each having first and second ends, each said handle forming a trough;

pair of cutting blades each connected to said first end of a respective one of said handles, said cutting blades functionally interconnected by a pivot joint;

a knife member having an edge, said knife member pivotally connected to said second end of one of said handles, said knife member being pivotable from a position disposed within said trough of said one handle to a position extending from said one handle; and a rake member pivotally connected to said second end of the other of said handles, said rake member being pivotable from a position disposed within said trough of said other handle to a position extending from said other handle.

* * * * *